United States Patent
Sang et al.

(10) Patent No.: US 11,833,718 B2
(45) Date of Patent: Dec. 5, 2023

(54) MOLD-RELEASABLE SURFACING MATERIALS FOR COMPOSITE PARTS

(71) Applicant: CYTEC INDUSTRIES INC., Princeton, NJ (US)

(72) Inventors: Junjie Jeffrey Sang, Newark, DE (US); Dalip Kumar Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 36 days.

(21) Appl. No.: 17/135,135

(22) Filed: Dec. 28, 2020

(65) Prior Publication Data

US 2021/0122088 A1 Apr. 29, 2021

Related U.S. Application Data (63) Continuation of application No. 16/065,160, filed as application No. PCT/US2016/068014 on Dec. 21, 2016, now Pat. No. 10,906,211.

(Continued)

(51) Int. Cl.
*B29C 33/56* (2006.01)
*B32B 5/02* (2006.01)
(Continued)

(52) U.S. Cl.
CPC ............. *B29C 33/56* (2013.01); *B32B 5/024* (2013.01); *B32B 5/22* (2013.01); *B32B 5/24* (2013.01);
(Continued)

(58) Field of Classification Search
CPC ....... B29C 33/56; B29C 70/088; B32B 15/02; B32B 15/08; B32B 15/092; B32B 15/20; B32B 2250/03; B32B 2250/04; B32B 2250/05; B32B 2255/02; B32B 2255/26; B32B 2260/021; B32B 2260/046; B32B 2262/0261; B32B 2262/0276; B32B 2262/101; B32B 2264/02; B32B 2264/102; B32B 2264/105; B32B 2264/108;
(Continued)

(56) References Cited

U.S. PATENT DOCUMENTS 4,702,874 A * 10/1987 Ohara ...................... B32B 7/06
264/300
10,906,211 B2 * 2/2021 Sang .................... B32B 15/092
(Continued)

FOREIGN PATENT DOCUMENTS

CN 103741476 A * 4/2014

OTHER PUBLICATIONS

Translation of CN 103741476 A, Cen et al., Apr. 23, 2014. (Year: 2014).*

*Primary Examiner* — Hai Vo
(74) *Attorney, Agent, or Firm* — Thi Dang (57) ABSTRACT

A surfacing material that is mold-releasable and electrically conductive. This surfacing material can be co-cured with a curable composite substrate and can be in contact with a mold surface such that when the cured composite part is removed from the mold, the surfacing material is releasable from the mold with ease. The mold-releasable surfacing material can effectively eliminate the need for mold release agents and mold surface preparation.

17 Claims, 2 Drawing Sheets

Related U.S. Application Data (60) Provisional application No. 62/270,808, filed on Dec. 22, 2015.

(51) Int. Cl.

| | | |
|---|---|---|
| *B32B 5/26* | (2006.01) | |
| *B32B 15/02* | (2006.01) | |
| *B32B 15/092* | (2006.01) | |
| *B32B 15/20* | (2006.01) | |
| *B32B 27/20* | (2006.01) | |
| *B32B 27/26* | (2006.01) | |
| *B32B 27/28* | (2006.01) | |
| *B32B 27/30* | (2006.01) | |
| *B32B 27/34* | (2006.01) | |
| *B32B 27/38* | (2006.01) | |
| *B32B 27/18* | (2006.01) | |
| *B32B 15/08* | (2006.01) | |
| *B32B 5/22* | (2006.01) | |
| *B32B 5/24* | (2006.01) | |
| *B29C 70/08* | (2006.01) | |

(52) U.S. Cl.
CPC ............... *B32B 5/26* (2013.01); *B32B 15/02* (2013.01); *B32B 15/08* (2013.01); *B32B 15/092* (2013.01); *B32B 15/20* (2013.01); *B32B 27/18* (2013.01); *B32B 27/20* (2013.01); *B32B 27/26* (2013.01); *B32B 27/283* (2013.01); *B32B 27/304* (2013.01); *B32B 27/34* (2013.01); *B32B 27/38* (2013.01); *B29C 70/088* (2013.01); *B32B 2250/03* (2013.01); *B32B 2250/04* (2013.01); *B32B 2250/05* (2013.01); *B32B 2255/02* (2013.01); *B32B 2255/26* (2013.01); *B32B 2260/021* (2013.01); *B32B 2260/046* (2013.01); *B32B 2262/0261* (2013.01); *B32B 2262/0276* (2013.01); *B32B 2262/101* (2013.01); *B32B 2264/02* (2013.01); *B32B 2264/102* (2013.01); *B32B 2264/105* (2013.01); *B32B 2264/108* (2013.01); *B32B 2307/202* (2013.01); *B32B 2307/4026* (2013.01); *B32B 2307/71* (2013.01); *B32B 2307/748* (2013.01)

(58) Field of Classification Search
CPC ...... B32B 2307/202; B32B 2307/4026; B32B 2307/71; B32B 2307/748; B32B 27/18; B32B 27/20; B32B 27/26; B32B 27/283; B32B 27/304; B32B 27/34; B32B 27/38; B32B 5/024; B32B 5/22; B32B 5/24; B32B 5/26
See application file for complete search history.

(56) References Cited

U.S. PATENT DOCUMENTS

| | | | |
|---|---|---|---|
| 2002/0007022 A1* | 1/2002 | Oosedo | C08J 5/249 525/527 |
| 2004/0197565 A1* | 10/2004 | Sugiura | D06M 15/273 428/413 |
| 2010/0287680 A1* | 11/2010 | Johnson | B32B 27/12 156/60 |
| 2014/0147688 A1* | 5/2014 | Corral | B29C 70/546 264/510 |
| 2014/0154496 A1* | 6/2014 | Sang | B32B 5/26 156/196 |
| 2014/0154504 A1* | 6/2014 | Adachi | C08J 7/0423 524/588 |
| 2015/0210813 A1* | 7/2015 | Arai | C09D 163/00 428/298.7 |

* cited by examiner

Mold Surface

FIG.3

MOLD-RELEASABLE SURFACING MATERIALS FOR COMPOSITE PARTS

CROSS-REFERENCE TO RELATED APPLICATIONS

The present application is a continuation of U.S. application Ser. No. 16/065,160, filed Jun. 22, 2018, which is a U.S. national phase entry under 35 U.S.C. § 371 of International Application No. PCT/US2016/068014, filed on 21 Dec. 2016, which claims priority to U.S. provisional Application No. 62/270,808, filed on 22 Dec. 2015, the entire content of each of these applications is explicitly incorporated herein by reference.

DETAILED DESCRIPTION

Molded carbon fiber-reinforced composite parts are particularly prevalent in the aerospace industry. For example, certain airplane parts such as fuselage and wings are constructed from multiple molded composite parts that are subsequently bonded together using a curable structural adhesive. One typical method for fabricating a composite part includes laying down layers of pliable prepreg plies on a mold to conform to the shape of the mold. Each prepreg ply is composed of reinforcement fibers, e.g. continuous, unidirectional carbon fibers, which have been pre-impregnated with a curable resin. The prepreg layup, while being on the mold, is consolidated and then cured with the application of heat and pressure to provide a finished, molded composite part. After the mold has cooled, the finished molded composite part is removed and the mold may be used again.

In order to prevent the finished molded part from sticking or adhering to the mold surface, a mold release agent is typically applied to the mold surface prior to laying down the prepreg plies onto the mold. Mold release agents are usually formed on the molds for facilitating the release of the cured parts from the molds on which they are formed. It is important for molded composite parts to be released from the mold surface using minimal force because, especially for the aerospace composite parts, the parts are often quite large and difficult to handle.

The choice of mold release agents (MRAs) affects the finish characteristics of the released part like gloss level, accurate texture reproduction, post molding operations (e.g. adhesive bonding or painting/coating of the molded part) in addition to influencing the mold service life in between maintenance cycles, and overall productivity. MRAs can be applied in different ways to prepare the mold surface. They may be applied by hand wiping or applied with a brush, a coater or spray equipment, and they provide chemical- and heat-resistant barriers between the mold and the composite part. There are four distinct types of release systems: paste wax, liquid polymer, PVA (polyvinyl alcohol) and semi-permanent. Unlike wax/parting film systems, semi-permanent mold releases bond to the mold surface rather than the part.

The use of mold release agent on a mold surface enables the cured part to separate from the mold while providing high quality surface to the part. However, mold preparation with MRAs is a multi-step, labor-intensive and costly process. As an example, a mold preparation may begin with sanding to impart a smooth, satin finish. Next, the mold surface is further improved by buffing out sanding marks to achieve highly polished finish. After buffing, a mold sealer is used. Finally, paste wax is applied and buffed. Post-molding operation may include removal of MRA build up, MRA contamination, eliminating streaking or other surface defects, re-apply MRA after each cycle. Such post-molding operation adds time and cost to the manufacturing process.

Figure 1:
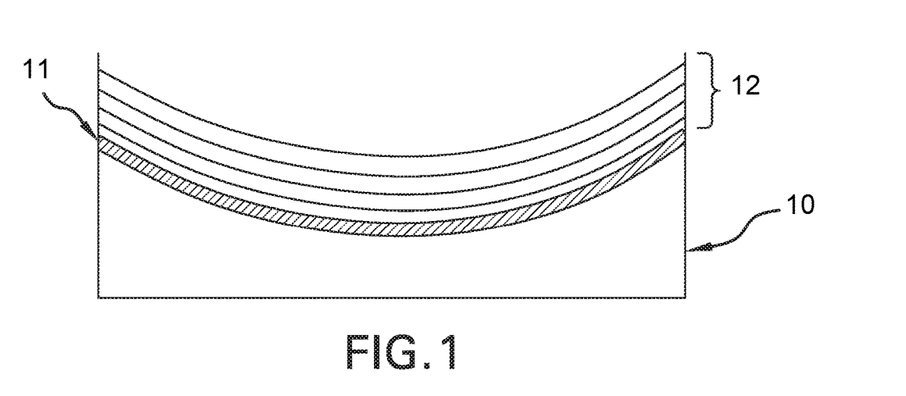
FIG. 1 schematically illustrates a prepreg layup and surfacing material being formed on a mold.

Another aspect of aerospace composite manufacturing is that the exposed surfaces of composite parts require a highly smooth surface prior to painting. To that end, surfacing films are routinely integrated into the fabrication of component parts to achieve such smooth surface. In the case of concave mold surface, a curable surfacing film may be placed onto a mold surface prior to laying down the composite prepreg plies. FIG. 1 schematically shows a mold 10 with a concave surface and the placement of a co-curable surfacing film 11 over the concave surface of the mold 10 prior to laying down a plurality of prepreg plies, forming a prepreg layup 12. The surfacing film 11 and the prepreg layup 12 are co-cured to form a composite part. After curing, it is common to remove mold release on the cured composite part by sanding followed by the application of a curable filler to fill in cracks and holes. The filler is then cured and sanded repeatedly to provide a smooth surface. This is followed by the application of a paint primer, sanding, reapplying paint primer, and then applying a finishing top coat of paint. This conventional process involves a high amount of labor and requires refinishing on a periodic basis. These recurring steps add significant cost to the manufacturing of composite parts.

Disclosed herein is a surfacing material that is mold-releasable (referred herein as "mold-releasable surfacing material") and electrically conductive. This material can be co-cured with a curable composite substrate and can be in contact with a mold surface such that when the cured composite part is removed from the mold, the surfacing material is releasable from the mold with ease. This mold-releasable surfacing material can effectively eliminate the need for mold release agents and mold surface preparation.

Moreover, in addition to the inherent mold-releasing capability described above, the surfacing material may further include a built-in primer function to provide UV protection to the composite part surface, thereby allowing it to achieve high paint adhesion even after extensive UV exposure. The combination of mold-releasable capability and built-in UV protection primer can result in significant material cost and weight-savings over conventional processes for manufacturing composite structural parts.

Figure 2:
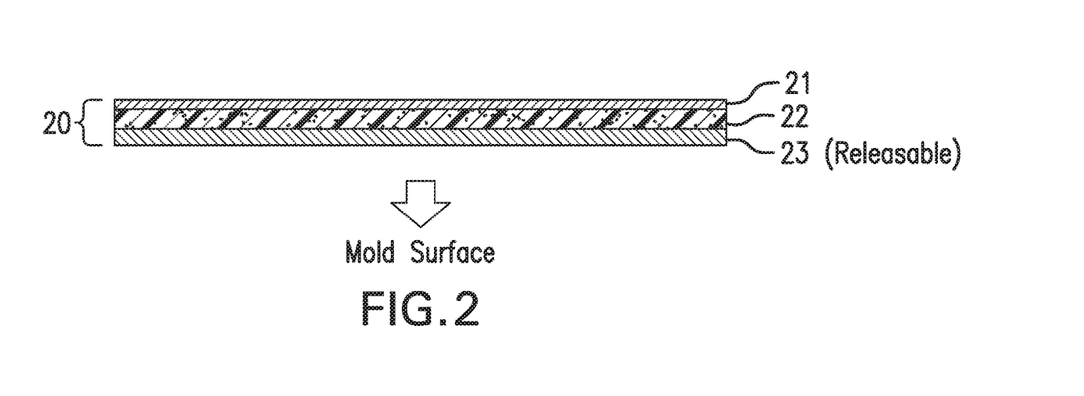
FIG. 2 schematically illustrates a mold-releasable surfacing material according to one embodiment.

According to one embodiment shown in FIG. 2, the mold-releasable surfacing material 20 is a multilayer structure that includes: (1) a nonporous conductive layer 21, which will be in contact with the curable composite substrate, e.g. prepreg layup; (2) a curable resin layer 22; and (3) a mold-releasable layer 23. The mold-releasable layer 23 will be in contact with the mold surface of the molding tool during composite part manufacturing. In an alternative embodiment shown in FIG. 3, the surfacing material includes a porous conductive layer 24 embedded in the curable resin layer 22 instead of the nonporous conductive layer 21.

Figure 3:
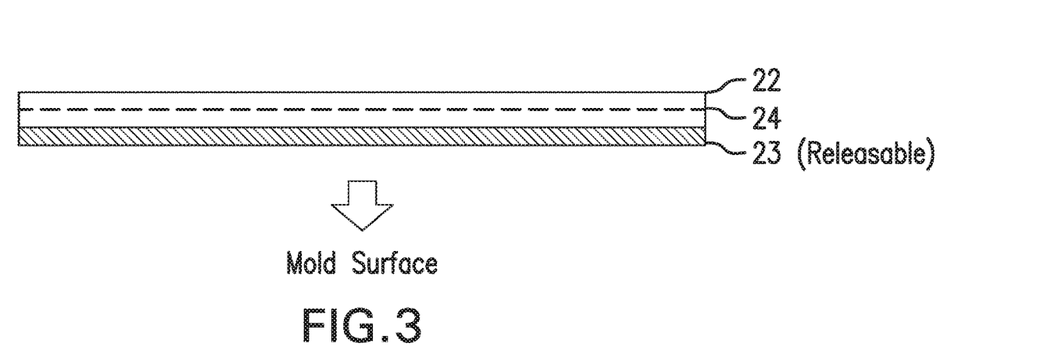
FIG. 3 schematically illustrates a mold-releasable surfacing material according to another embodiment.

After the composite substrate together with the surfacing material have been cured, the mold-releasable layer 23

(shown in FIGS. 2 and 3) is peeled off to reveal the cured resin layer 22 as the outermost layer that is ready for painting without requiring any re-finishing such as sanding and filling prior to painting.

Mold-Releasable Layer

According to one embodiment, the mold-releasable layer consists of a woven fabric that is bonded to one side to a microporous polymer film. The microporous polymer layer has tiny pores of about 1 μm (micron) to about 5 μm in diameter distributed throughout. The microporous polymer layer may be made of a fluoropolymer selected from, but are not limited to, polytetrafluoroethylene (PTFE), polyvinylidene fluoride (PVDF), polyvinylfluoride (PVF), fluorinated ethylene-propylene (FEP), polychlorotrifluoroethylene (PCTFE), perfluoroalkoxy polymer (PFA), polyethylenetetrafluoroethylene (ETFE), polyethylene-chlorotrifluoro-ethylene (ECTFE), perfluoropolyether (PFPE), and combinations thereof. In one embodiment, the microporous polymer layer is made of or comprises mainly of PTFE. In another embodiment, the microporous polymer layer is made of or comprises mainly of polyamide. The thickness of the microporous polymer layer may be in the range of about 20 to about 100 μm, for example, 30-50 μm. In use, the microporous polymer layer is in contact with the mold surface of the molding tool and the woven fabric is adjacent to the curable resin layer. Here, the woven fabric functions as a dry peel dry.

The woven fabric is a light-weight, woven material composed of continuous fibers, with an areal weight in the range of about 20 gsm to about 150 gsm, particularly, 40 to about 125 gsm. "gsm" refers to g/m². The woven fabric may be composed of glass fibers (or fiberglass), polyester fibers, thermoplastic fibers such as polyamide (e.g. nylon) fibers, or combinations thereof. The woven fibers may have diameters within the range of about 10 μm to about 15 μm.

In another embodiment, the mold-releasable layer consists of a woven fabric that has been coated on one or both sides with a film of fluoropolymer or silicone. The coating areal weight may be in the range of about 50 gsm to about 100 gsm in total. The woven fabric is as described above. In use, a coated side is in contact with the mold surface of the molding tool.

The fluoropolymer for the coated fabric may be selected from the list of fluoropolymers disclosed above for the microporous polymer layer. PTFE is particularly suitable. In some embodiments, the fluoropolymer-coated fabric is a PTFE-coated fiberglass fabric with coating on both sides and a total thickness in the range of about 0.003 in to about 0.01 in (or about 76 μm to about 254 μm). An example of such PTFE-coated fiberglass fabric is PRECISIONFAB™ Teflon-coated fabrics from Precision Coating & Coated Fabrics, Tapes, Belts (Massachusetts, USA). The PTFE-coated fiberglass fabric may further include a silicone adhesive film on one side such that the adhesive film is in contact with the curable resin film 22. This adhesive film may have a thickness of about 5 mils to about 10 mils (about 127 μm to about 254 μm). The silicone adhesive is a pressure sensitive adhesive, which, upon heating or applying pressure, adheres to the resin layer 22, but can be separated from the resin layer 22 when cooled down to ambient temperature. The silicone (also known as polysiloxane) for the coated fabric is an elastomeric polymer made up of repeating units of siloxane, which is a chain linkage of alternating silicon atoms and oxygen atoms. In one embodiment, the silicone coating is formed by applying a liquid silicone elastomer formulation containing an organopolysiloxane polymer such as polydimethylsiloxane (PDMS) followed by curing.

In some embodiments, the silicone-coated fabric is a silicone-coated fiberglass fabric with coating on one side and a total thickness in the range of about 0.01 in to about 0.025 in (or about 254 μm to about 635 μm). An example of such silicone-coated fiberglass fabric is PRECISIONSIL™ Silicone-coated fabric from Precision Coating & Coated Fabrics, Tapes, Belts (Massachusetts, USA).

In yet another embodiment, the mold-releasable layer consists of (a) a woven fabric that is bonded on one side to a curable epoxy-thermoplastic layer; (b) a curable resin layer in contact with the opposite side of the woven fabric; and (c) a conductive layer laminated to or embedded in the curable resin layer.

The curable epoxy-thermoplastic layer is formed from a curable epoxy-thermoplastic composition, which contains:
  (i) polyvinyl formal (a thermoplastic polymer)
  (ii) at least one epoxy resin, preferably, a low-viscosity epoxy resin with a viscosity of about 30 to about 60 mPa·s at 25° C. (as measured by ASTM D-445)
  (iii) a curing agent and/or catalyst for the epoxy resin
  (iv) a lubricant, particularly, polyol such as glycerol (or glycerine)

The weight ratio of polyvinyl formal (i) to epoxy (ii) may be 80:20 to 50:50 The amount of lubricant (iv) may be 5 to 30 parts in weight per 100 parts of components (i) and (ii) combined.

Polyvinyl formal resins are thermoplastic polymers formed from polyvinyl alcohol and formaldehyde as copolymers with polyvinyl acetate. An example of a commercially available polyvinyl formal resin is Vinylec® from SPI Supplies.

In one embodiment, low-viscosity epoxy resin (ii) is a liquid reaction product of epichlorohydrin and dipropylene glycol. A suitable commercial product is D.E.R.™ 736 from Dow Chemical Co. Other low-viscosities epoxies include Bisphenol-A or Bisphenol-F-type epoxy resins, for example, D.E.R.™ 331 (a liquid reaction product of epichlorohydrin and bisphenol A) from Dow Chemical Co., Epon® 828 (difunctional bisphenol A/epichlorohydrin derived liquid epoxy resin) from Hexion, Epon® 863 (a low viscosity, undiluted, difunctional epoxy resin produced from bisphenol-F (BPF) and epichlorohydrin) from, or Epalloy® 5000 (diepoxide of the cycloapliphaticalcohol, hydrogenated Bisphenol A) from CVC Thermoset Specialties. Suitable curing agents (iii) for the low-viscosity epoxy resins mentioned herein include amine curing agents, for examples, dicyandiamide (DICY), 4, 4'-diamino-diphenylsulfone (4,4'DDS), and 3,3'-diaminodiphenylsulfone (3,3'DDS), guanamine, guanidine, aminoguanidine, piperidine and combinations thereof. The curing agent may be present in an amount within the range of about 1 parts to about 10 parts in weight per 100 parts of epoxy resin (in total).

Curing catalysts may be added to accelerate curing. Suitable catalysts include alkyl and aryl substituted ureas (including aromatic or alicyclic dimethyl urea), and bisureas, particularly bisureas based on toluenediamine or methylene dianiline, and combinations thereof. One example of bisurea is 4,4'-methylene bis(phenyl dimethyl urea), commercially available as Omicure® U-52 or CA 152 from CVC Chemicals, which is a suitable accelerator for dicyandiamide. Another example is 2,4-toluene bis(dimethyl urea), commercially available as Omicure® U-24 or CA 150 from CVC Chemicals. The curing catalyst may be present in an amount within the range of about 1 part to about 10 parts in weight per 100 parts of epoxy resin.

To form the epoxy-thermoplastic composition into a layer, an organic solvent may be added to the composition to aid the film formation. Suitable solvents include alkyl alcohols, toluene, and mixtures thereof. In one embodiment, a solvent blend of toluene, 1-methoxy-2-propanol, ethanol, and 1,3-dioxolane is used The solvent may be added in an amount sufficient to produce a solid content of about 20% to about 70%. The epoxy-thermoplastic composition containing the solvent can be coated onto one side of the woven fabric. The solvent is removed by drying after the resin film has been formed. The total areal weight of the epoxy-thermoplastic film(s) formed with the woven fabric may be, for example, about 200 gsm to about 250 gsm (about 0.04 to 0.05 psf).

Conductive Layer

For the embodiment depicted by FIG. 2, the nonporous conductive layer may be a solid thin metal foil with a thickness of less than about 76 μm, for example, within the range of about 5 μm to about 75 μm.

For the embodiment depicted by FIG. 3, the porous conductive layer may be an expanded metal foil or metal screen with an areal weight within the range of about 60 gsm to about 350 gsm.

The nonporous and porous conductive layer may be formed of metals selected from: copper, aluminum, bronze, titanium, alloys and combinations thereof. Alternatively, the conductive layer may be formed of a non-metallic material with intrinsic electrical conductivity such as carbon. The nonporous conductive layer may be a carbon sheet, including graphene sheet and carbon-nanotube (CNT) paper. A specific example of CNT paper is flexible CNT Bucky paper.

Curable Resin Layer

The curable resin layer in the various embodiments disclosed herein (layer 22 in FIGS. 2 and 3) is formed from a thermosettable resin composition containing one or more thermoset resins and a curing agent.

The terms "cure" and "curing" as used herein refer to the irreversible hardening of a pre-polymer material or a resin precursor brought about by heating at elevated temperatures, exposure to ultraviolet light and radiation, or chemical additives. The term "curable" means possible to be cured into a hardened material.

Examples of suitable thermoset resins include, but are not limited to, epoxies, phenolic resins, cyanate esters, bismaleimides, benzoxazines (including polybenzoxazines), unsaturated polyesters, vinyl ester resins, and combinations thereof.

In some embodiments, the thermosettable resin composition contains one or more multifunctional epoxy resins. Multifunctional epoxy resin (or polyepoxide) contains two or more epoxy functional groups per molecule.

Examples of suitable multifunctional epoxy resins include the polyglycidyl ethers, which are prepared by reaction of epichlorohydrin or epibromohydrin with a polyphenol in the presence of alkali. Suitable polyphenols are, for example, resorcinol, pyrocatechol, hydroquinone, bisphenol A (bis(4-hydroxyphenyl)-2,2-propane), bisphenol F (bis(4-hydroxyphenyl) methane), bis(4-hydroxyphenyl)-1,1-isobutane, 4,4'-dihydroxy-benzophenone, bis(4-hydroxyphenyl)-1,1-ethane, and 1,5-hydroxynaphthalene.

Also included are the polyglycidyl ethers of polyalcohols. Such polyalcohols include ethylene glycol, diethylene glycol, triethylene glycol, 1,2-propylene glycol, 1,4-butylene glycol, triethylene glycol, 1,5-pentanediol, 1,6-hexanediol, and trimethylolpropane.

Additional epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides may include those derived from the epoxidation products of olefinically-unsaturated cycloaliphatic compounds or from natural oils and fats.

Also included are liquid epoxy resins which are reaction products of bisphenol A or bisphenol F and epichlorohydrin. These epoxy resins are liquid at room temperature and generally have epoxy equivalent weight (g/eq) of from about 150 to about 480 as determined by ASTM D-1652.

Particularly suitable are epoxy novolac resins which are polyglycidyl derivatives of phenol-formaldehyde novolacs or cresol-formaldehyde novolacs having the following chemical structure:

wherein n=0 to 5, and R=H or CH$_3$. When R=H, the resin is a phenol novolac resin. When R=CH$_3$, the resin is a cresol novolac resin. The former is commercially available as D.E.N. 428, D.E.N. 431, D.E.N. 438, D.E.N. 439, and D.E.N. 485 from Dow Chemical Co. The latter is commercially available as ECN 1235, ECN 1273, and ECN 1299 from Ciba-Geigy Corp. Other suitable novolacs that may be used include SU-8 from Celanese Polymer Specialty Co. In a preferred embodiment, the epoxy novolac resin has a viscosity of 4000-10,000 mPa·s at 25° C. and epoxide equivalent weight (EEW) of about 190 g/eq to about 235 g/eq as determined by ASTM D-1652.

A particularly suitable multifunctional epoxy resin is a tetra-functional aromatic epoxy resin having four epoxy functional groups per molecule and at least one glycidyl amine group. An example is tetraglycidyl ether of methylene dianiline having the following general chemical structure:

The amine groups in structure are shown in the para- or 4,4' positions of the aromatic ring structures, however, it should be understood that other isomers, such as 2,1', 2,3', 2,4', 3,3', 3,4', are possible alternatives. Examples of commercially available tetra-functional epoxy resins are Araldite® MY 9663, MY 9634, MY 9655, MY-721, MY-720, MY-725 supplied by Huntsman Advanced Materials.

Another particularly suitable multifunctional epoxy resin is tri-functional epoxy resin, for example, triglycidyl ether of aminophenol. Specific examples of commercially available tri-functional epoxy resins are Araldite® MY 0510, MY 0500, MY 0600, MY 0610 supplied by Huntsman Advanced Materials.

Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol as represented by the following structure:

An example of such cycloaliphatic epoxies is EPAL-LOY® 5000 (a cycloaliphatic epoxy prepared by hydrogenating bisphenol A diglycidyl ether) available from CVC Thermoset Specialties. Other cycloaliphatic epoxies may include EPONEX cycloaliphatic epoxy resins, e.g. EPONEX Resin 1510 supplied by Momentive Specialty Chemicals.

The thermosettableresin composition may be formulated so as to yield high $T_g$ and high cross-linking density. In some embodiments, a combination of epoxy novolac resin(s) and non-novolac multifunctional epoxy resin(s), particularly, tri-functional and/or tetra-functional epoxy, is used. The relative amounts of epoxy novolac resin and non-novolac multifunctional epoxy resin may be varied but it is preferred that the amount of epoxy novolac resin is within the range of about 80 to about 100 parts per 100 parts of non-novolac multifunctional epoxy resin. The combination of epoxy novolac resin and multifunctional epoxy resin at the specified proportion contribute to the desired high $T_g$ and cross-linking density upon curing.

The total amount of all resins makes up at least 15% by weight based on the total weight of the thermosettable resin composition. As an example, the total amount of resins may constitute about 30% to about 60% by weight based on the total weight of the thermosettable resin composition, or about 15% to about 25% by weight.

In some embodiments, the thermosettable resin composition includes a combination of certain multifunctional thermoset resins, a polymeric toughening component to toughen the resin matrix, a latent amine-based curing agent, ceramic microspheres as a fluid barrier component, and particulate inorganic fillers as a rheology modifying component. The multifunctional resins and the ceramic microspheres make up more than 35% by weight of the total composition, preferably more than 45% by weight.

Polymeric Toughening Agents

The thermoset composition may further include one or more polymeric toughening agents. The polymeric toughening agents may be selected from: thermoplastic polymers, elastomers, core-shell rubber particles, a pre-react adduct which is a reaction product of an epoxy resin, a bisphenol, and an elastomeric polymer. In some embodiments, a combination of two or more different toughening agents from this group is used. The amount of toughening agent(s), in total, may be about 1% to about 30%, in some cases, about 10% to about 20% by weight based on the total weight of the composition. With regard to the pre-react adduct, suitable epoxy resins include diglycidylether of Bisphenol A, diglycidylether of tetrabromo Bisphenol A, hydrogenated diglycidyl ether of bisphenol A, or hydrogenated diglycidyl ether of bisphenol F.

The bisphenol in the pre-react adduct functions as a chain extension agent for the linear or cycloaliphatic epoxy. Suitable bisphenols include bisphenol A, tetrabromo bisphenol A (TBBA), Bisphenol Z, and tetramethyl Bisphenol A (TMBP-A).

Suitable elastomers for forming the pre-react adduct include, but are not limited to, liquid elastomers such as amine-terminated butadiene acrylonitrile (ATBN), carboxyl-terminated butadiene acrylonitrile (CTBN), and carboxyl-terminated butadiene (CTB). Also possible are fluorocarbon elastomers, silicone elastomers, styrene-butadiene polymers. In an embodiment, the elastomer used in the pre-react adduct is ATNB, CTBN or CTB.

In one embodiment, the epoxy resin is reacted with the bisphenol chain extension agent and the elastomer polymer in the presence of a catalyst, such as triphenyl phosphine (TPP), at about 300° F. (or 148.9° C.) to chain link the epoxy resins and to form a high viscosity, film-forming, high molecular-weight epoxy resin pre-react adduct. The pre-react adduct is then mixed with the remaining components of the thermoset composition.

Suitable thermoplastic tougheners include polyarylsulfone polymers such as polyether sulfone (PES), polyether ether sulfone (PEES). In some embodiments, the toughening agent is a copolymer of PES and PEES, which is described in U.S. Pat. No. 7,084,213. In some embodiments, the toughener is poly(oxy-1,4-phenylenesulfonyl-1,4-phenylene), which has a $T_g$ of about 200° C. as measured by Differential Scanning Calorimetry (DSC).

The toughening component may be core-shell rubber (CSR) particles having particle size of 300 nm or less. Particle size can be measured by a laser diffraction technique, for example, using a Malvern Mastersizer 2000 instrument. The CSR particles may be any of the core-shell particles where a soft core is surrounded by a hard shell. Preferred CSR particles are those having a polybutadiene rubber core or butadiene-acrylonitrile rubber core and a polyacrylate shell. CSR particles having a hard core surrounded by a soft shell may also be used, however. The CSR particles may be supplied as a 25%-40% in weight percentage of CSR particles dispersed in a liquid epoxy resin. CSR particles having rubber cores and polyacrylate shells are available commercially from Kaneka Texas Corporation (Houston, Tex.) under the trade names Kane Ace MX. It is preferred, but not required, that the core-shell rubber particles be added to the surfacing film composition as a suspension of particles in a suitable liquid epoxy resin. Kane Ace MX 411 is a suspension of 25% by weight core-shell rubber particles in MY 721 epoxy resin and is a suitable source of core-shell rubber particles. Kane Ace MX 120, MX 125, or MX 156, which contains 25-37% by weight of the same core-shell rubber particles dispersed in DER 331 resin, is also a suitable source of core-shell rubber particles. Other suitable source of core-shell rubber particles, such as MX 257, MX 215, MX217 and MX 451, may also be used. Another commercial source of core-shell rubber particles is Paraloid™ EXL-2691 from Dow Chemical Co. (methacrylate-butadiene-styrene CSR particles with average particle size of about 200 nm).

Curing Agents

Suitable curing agents include a variety of latent amine-based curing agents, which are activated at elevated temperatures (e.g. temperature above 150° F. (65° C.)). Examples of suitable curing agents include dicyandiamide (DICY), 4, 4'-diamino-diphenylsulfone (4,4'DDS), and 3,3'-diaminodiphenylsulfone (3,3'DDS), guanamine, guanidine, aminoguanidine, piperidine, combinations and derivatives thereof. Compounds in the class of imidazoles and amine complexes may also be used. In an embodiment, the curing agent is dicyandiamide. The amine-based curing agent is present in an amount within the range of about 1% to about 5% by weight based on the total weight of the resin film composition.

A curing accelerator may be used in conjunction with the amine-based curing agent to promote the curing reaction between the epoxy resins and the amine-based curing agent. Suitable curing accelerators may include alkyl and aryl substituted ureas (including aromatic or alicyclic dimethyl urea), and bisureas based on toluenediamine or methylene dianiline. One example of bisurea is 4,4'-methylene bis (phenyl dimethyl urea), commercially available as Omicure U-52 or CA 152 from CVC Chemicals, which is a suitable accelerator for dicyandiamide. Another example is 2,4-toluene bis(dimethyl urea), commercially available as Omicure U-24 or CA 150 from CVC Chemicals. The curing accelerator may be present in an amount within the range of about 0.5% to about 3% by weight based on the total weight of the thermoset composition.

Built-In UV Protection

Conventional epoxy-based surfacing films have been found to lack UV resistance, and after exposure to UV radiation, they showed color change and/or surface degradation, such as chalking and loss of paint adhesion. To overcome this shortcoming, a paint primer with UV protection components is typically applied to cover all exposed composite surfaces of composite part soon after de-molding the cured composite part from the mold. The drawbacks to using such paint primer include high labor cost, high maintenance cost, added weight and adverse environmental impacts due to organic solvents typically used in the paint primers.

To provide built-in UV protection, the thermosettable resin composition of the present disclosure further comprises one or more UV stabilizer(s) or absorber(s) in an amount of about 0.5% to about 5% by weight based on the total weight of the composition. Examples of UV stabilizers that may be added to the resin composition include butylated hydroxytoluene (BHT); 2-hydroxy-4-methoxy-benzophenone (e.g. UV-9); 2,4-bis(2,4-dimethylphenyl)-6-(2-hydroxy-4-octyloxyphenyl)-1,3,5-triazine (e.g. CYASORB® UV-1164 light absorber); 3,5-di-tert-butyl-4-hydroxybenzoic acid; n-hexadecyl ester (e.g. CYASORB® UV-2908 light stabilizer); and Pentaerythritol Tetrakis(3-(3,5-di-tert-butyl-4-hydroxyphenyl)propionate (e.g. IRGANOX 1010). Liquid hindered-amine light stabilizer from Ciba Specialty Chemicals, such as 2-(2H-benzotriazol-2-yl)-4,6-ditertpentylphenol (e.g. TINUVIN 328), Methyl 1,2,2,6,6-pentamethyl-4-piperidyl sebacate (e.g. TINUVIN 292), Decanedioic acid, bis(2,2,6,6-tetramethyl-1-(octyloxy)-4-piperidinyl ester (e.g. TINUVIN 123), and 2,2,6,6-tetramethyl-4-piperidinyl stearate (e.g. CYASORB® UV-3853 from Cytec Specialty Chemicals) may also be used as suitable UV stabilizers.

In addition, inorganic metal oxide pigments such as nano-sized zinc oxide (n-ZnO), e.g. NanoSunGuard 3015, and nano-sized titanium dioxide particles (n-$TiO_2$) may also be added to enhance UV protection. Particularly suitable are nano-sized $TiO_2$ particles in the crystalline form of rutile, for example, $TiO_2$ pigments sold under the trademark Ti-Pure® by DuPont. "nano-sized" as used herein includes particle sizes of less than 1 micron. For example, particles having particle size in the range of 100 nm to 500 nm are suitable. Particle size can be measured by a laser diffraction technique, for example, using a Malvern Mastersizer 2000 instrument. In some embodiments, a high amount of $TiO_2$ particles, preferably, rutile $TiO_2$ particles ($TiO_2$ in the crystalline form of rutile), are added in an amount of about 40% to about 65% by weight based on the total weight of the thermoset resin composition.

Additional pigments and/or dyes known in the art may be added to provide color to resin layer, for example, red iron oxide, green chromium, and carbon black.

Conductive Fillers

Conductive materials in particulate form, e.g. particles, flakes, or nano-tubes, may also be added to the thermosettable resin composition to increase the electrical conductivity of the final surfacing material. Examples of suitable conductive materials include metals such as silver, gold, nickel, copper, aluminum, bronze, and alloys thereof, in the form of flakes or particles. Carbon-based materials, such as carbon nano-tubes (single-wall nano tubes or multi-wall nano tubes), carbon nano-fibers, and graphene may also be used as conductive additives to impart the electrical conductivity to the resin film. The nano-fibers may have diameters ranging from 70 to 200 nanometers and a length of about 50-200 microns. The nano-tubes may have an outer diameter of about 10 nanometers, length of about 10,000 nanometers, and an aspect ratio (L/D) of about 1000. In addition, conductive additives may also include carbon black particles (such as Printex XE2 from DeGussa). If present, the amount of conductive materials may be in the range of about 3% to about 70% by weight based on the total weight of the thermoset resin composition.

In one embodiment, the thermosettable composition for forming the curable resin layer has the following formulation, in weight percentages based on the total weight of the composition: (a) 20%-26% multifunctional epoxy resins, e.g. a difunctional epoxy resin such as Diglycidylether of Bisphenol A in combination with a tetra-functional epoxy resins such as tetraglycidylether methylenedianiline and Diglycidylether of Tetrabromo Bisphenol A; (b) 2%-3% toughening agent selected from CTBN, CTB, ATBN, PES-PEES copolymer, and combinations thereof; (c) 4%-14% ceramic microspheres; (d) 1%-5% latent amine-based curing agent such as 4, 4'-DDS and DICY; (e) 1%-4% UV stabilizers; (f) 50%-62% $TiO_2$; (g) 0.1-1% carbon black; and (h) optionally, 1%-2% curing accelerator such as urea.

Applications

The mold-releasable surfacing material disclosed herein can be applied onto and co-cured with a fiber-reinforced composite substrate containing a curable resin matrix at a temperature above 150° F. (65° C.), more particularly, within the range of 200° F. to 365° F. (or 93° C. to 185° C.). The fiber-reinforced composite substrate is composed of reinforcement fibers which have been impregnated or infused with a curable matrix resin. In some embodiments, the composite substrate may be a prepreg ply or prepreg layup. The prepreg layup is composed of a plurality of prepreg plies arranged one on top of another in a stacking sequence. Each prepreg ply is composed of reinforcement fibers in the form of a fabric ply or directionally aligned, continuous fibers that have been impregnated/infused with a curable matrix resin, e.g. epoxy resin. The directionally aligned fibers may be unidirectional or multi-directional fibers.

The mold-releasable surfacing material of the present disclosure may be in the form of a flexible tape, which is lightweight and is configured for an automated placement process such as Automated Tape Laying (ATL) or Automated Fiber Placement (AFP), referred hereafter as "surfacing tape". The surfacing tape may have a width of about 0.125 in to about 12 in (or about 3.17 mm to about 305 mm). In one embodiment, the surfacing tape has a width of about 0.125 in to about 1.5 in (or about 3.17 mm to about 38.1 mm), including about 0.25 in to about 0.50 in (or about 6.35 mm to about 12.77 mm). In another embodiment, the surfacing tape has a width of about 6 in to about 12 in (or about 152 mm to about 305 mm). The length of the tape is continuous or is very long relative to its width, for example, 100-100,000 times its width. In continuous form, the surfacing tape can be wound up into a roll for storage before its application in an automated process.

The continuous surfacing tape may be incorporated into an ATL/AFP process that automatically lays down continuous, resin-impregnated prepreg tapes to form the composite structure. Each prepreg tape is composed of unidirectional reinforcement fibers, e.g. carbon fibers, which are embedded in a curable resin matrix, e.g. epoxy-based matrix. When the surfacing tapes are used in such automated placement process, the surfacing tapes are laid down first onto the mold surface. The tapes are dispensed side by side to create a surfacing layer of desired width and length. Subsequently, individual prepreg tapes are laid down onto the surfacing layer and then additional layers are built onto a prior layer to provide a prepreg layup with a desired thickness. The subsequent tapes may be oriented at different angles relative to prior tapes. All tapes are laid down at high speed, using one or more numerically controlled placement heads to dispense, clamp, cut and restart each tape during placement. Such ATL/AFP process is conventionally used for the manufacturing of large composite aerospace structures, such as fuselage sections or wing skins of aircrafts. This automated placement process eliminates some of the intermediate processing steps that are typical in the conventional methods of manually applying large surfacing films onto an existing prepreg layup.

EXAMPLES

Example 1

Four epoxy-thermoplastic compositions for forming mold-releasable layers were prepared according to the formulations shown in Table 1 (Formulations A, B, C, D). All amounts shown are in grams.

TABLE 1

| Components | Formula A | Formula B | Formula C | Formula D |
|---|---|---|---|---|
| Polyvinyl formal | 70 | 60 | 60 | 60 |
| Epoxy | 30 | 40 | 40 | 40 |
| Glycerine | 25 | 30 | 25 | 20 |
| Urea | 2 | 2 | | |
| DICY | | | 1.5 | 1 |
| 4,4'-DDS | | | 2.5 | |
| Red Dye | 0.1 | 0.1 | 0.1 | 0.1 |
| BSM-200 solvent | 300 | 300 | 300 | 300 |

Urea is 2,4-toluene bis(dimethyl urea) from CVC Chemicals. Epoxy is D.E.R.™ 736 from Dow Chemical Co. BSM-200 solvent is a mixture of toluene, 1-methoxy-2-propanol, ethanol, and 1,3-dioxolane.

Each composition was then coated onto a release paper to form a resin film. After drying off the solvent, the film weight was 0.05 psf (250 gsm). The resin film was laminated to one side of a polyester woven fabric with an areal weight of 84 gsm to form an epoxy-thermoplastic resin release layer. Then, the resulting resin/fabric laminate was combined with a curable epoxy-based surfacing layer, SM 905 from Cytec Industries Inc., and a solid copper foil (18 microns thick) such that the surfacing layer SM 905 was between the woven fabric and the copper foil. Heat and pressure were applied to the combined layers using a hot press to form the final surfacing material.

Example 2

Three resin compositions for forming UV-resistant resin films were prepared according the formulations shown in Table 2 (Formulations M8, M9, M12). Amounts shown are in parts based on weight unless indicated otherwise.

TABLE 2

| Components | M8 | M9 | M12 |
|---|---|---|---|
| Diglycidylether of Bisphenol A | 10 | 10 | 3 |
| Tetraglycidylether methylenedianiline | 2 | 2 | 10 |
| Diglycidylether of Tetrabromo Bisphenol A | 6 | 6 | 3 |
| ATBN | 1 | 1 | 1 |
| CTB elastomer | 1 | 1 | 1 |
| Epoxy novolac resin | | | 8 |
| PES-PEES co-polymer | | | 1 |
| Cycloaliphatic epoxy | 6 | 6 | |
| Rutile TiO$_2$ (Ti-Pure ™) | 62 | 62 | 50 |
| Carbon Black | 1 | 1 | 1 |
| UV Stabilizers | | | |
| Irganox 1010 | 1 | | 1.4 |
| Tinuvin 328 UVA | 1 | | |
| Tinuvin 292 HALS | 1 | | |
| Tinuvin 400 UVA | | | 1.3 |
| Tinuvin 123 HALS | | | 1.3 |
| Cyasorb UV- 3853 HALS | | 1 | |
| Cyasorb UV 1164 UVA | | 0.5 | |
| Cyasorb UV 2908 LS | | 1 | |
| Silica-Alumina ceramic microspheres (G-200 Zeeospheres) | 4 | 4 | 14 |
| DICY | 1.5 | 2 | 2 |
| 4,4'-DDS | | 2 | |
| Urea | 2 | | 1 |
| Fumed silica (Cab-o-Sil TS-720) | 0.5 | 0.5 | 1 |
| Total | 100 | 100 | 100 |
| UV stabilizers (wt %) | 3.00% | 2.50% | 4.00% |
| TiO$_2$ (wt %) | 62.00% | 62.00% | 50.00% |

The epoxy novolac resin was D.E.N.™ 439, a semi-solid reaction product of epichlorohydrin and phenol-formaldehyde novolac. The cycloaliphatic epoxy was Epalloy® 5000). Ti-Pure™ pigments from DuPont were used as rutile TiO$_2$. The weight percentage (wt %) of UV stabilizers and TiO$_2$ indicates the total amount of each component in the formulation.

Each resin composition was coated onto a release paper using a film coater to form a resin film. The resin films were then cured and tested for UV stability and paint adhesion performance.

The cured resin film was evaluated for its UV resistance by exposing the film to an UV test unit (QUV accelerated weather tester from Q-Lab Corporation using fluorescent UVA lamps) at a given UV intensity (1.5 W/m$^2$) for extended time (up to 168 hours). The color resistance of the surfacing film was measure by its total color change ($\Delta E^*$) after UV exposure.

Paint adhesion of the resin film, with or without UV exposure prior to painting, was measured according to ASTM D3359. ASTM D3359 refers to a Standard Test Method for assessing the surface adhesion of coating films to substrates by applying and removing pressure-sensitive tape over cuts made in the film (cross-hatch scribe tape test).

After UV exposure, each resin film was applied with a paint coating (epoxy paint primer followed by a polyurethane based top-coat). Subsequently, a dry paint adhesion test was conducted in accordance with ASTM D3359. Ranking of greater than 8 is considered excellent.

The results of UV resistance and paint adhesion of the different UV resistant surfacing films are reported in Table 3. As shown from the results, these films demonstrated excellent UV stability with minimum color change (ΔE*<4). The films also exhibited excellent paint adhesion before and after extended period of UV exposure.

TABLE 3

| Performance—UV stability, Paint Adhesion | M8 | M9 | M12 |
|---|---|---|---|
| UV stability—Color Shift (Delta E*), after UV exposure | 3.9 | 2.7 | 3 |
| Paint Adhesion (before UV exposure) | 10 | 10 | 10 |
| Paint Adhesion (after UV exposure) | 8 | 10 | 9 |

To form the mold-releasable conductive surfacing material, the resin film formed from each of the resin compositions disclosed in Table 2 can be combined with a metal foil or expanded metal screen and one of the embodiments for "mold-releasable" layer disclosed herein using a laminator to form a multi-layered structure (as shown in FIG. 2 and FIG. 3) through a lamination process under appropriate temperature and pressure.

TERMS, DEFINITIONS, AND ABBREVIATIONS

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

What is claimed is:

1. A surfacing material that is mold-releasable and electrically conductive, comprising:
   (a) a woven fabric that is in direct contact with and bonded on one side to a curable epoxy-thermoplastic layer;
   (b) a curable resin layer in direct contact with and bonded to the opposite side of the woven fabric, said resin layer comprising one or more thermoset resins and a curing agent; and
   (c) a conductive layer laminated to or embedded in the curable resin layer, wherein the curable epoxy-thermoplastic layer comprises:
      (i) polyvinyl formal;
      (ii) at least one epoxy resin;
      (iii) a curing agent and/or a catalyst for the epoxy resin; and
      (iv) a polyol.

2. The surfacing material of claim 1, wherein the weight ratio of polyvinyl formal (i) to epoxy (ii) is in the range of 80:20 to 50:50, and the amount of polyol (iv) is in the range of 5 to 30 parts in weight per 100 parts of components (i) and (ii) combined.

3. The surfacing material of claim 1, wherein the epoxy resin (ii) in the epoxy-thermoplastic layer is a low-viscosity epoxy resin having a viscosity of about 30 to about 60 mPa·s at 25° C. (as measured by ASTM D-445).

4. The surfacing material of claim 3, wherein the low-viscosity epoxy resin is a reaction product of epichlorohydrin and dipropylene glycol.

5. The surfacing material according to claim 1, wherein the polyol is glycerol (or glycerine).

6. The surfacing material according to claim 1, wherein the curable epoxy-thermoplastic layer comprises a curing agent selected from: dicyandiamide (DICY), 4, 4'-diaminodiphenylsulfone (4,4'DDS), and 3,3'-diaminodiphenylsulfone (3,3'DDS), guanamine, guanidine, aminoguanidine, piperidine, and combinations thereof.

7. The surfacing material according to claim 1, wherein the curable epoxy-thermoplastic layer comprises a catalyst selected from: alkyl and aryl substituted ureas, bisureas, and any combination thereof.

8. The surfacing material of claim 1, wherein the curable resin layer (b) further comprises at least one Ultraviolet (UV) stabilizer or absorber and metal oxide pigments, and wherein the metal oxide pigments are present in an amount of about 40% to about 65% by weight based on the total weight of the curable resin layer.

9. The surfacing material of claim 1, wherein the curable resin layer (b) further comprises a color pigment selected from: red iron oxide, green chromium, carbon black, and any combination thereof.

10. The surfacing material of claim 1, wherein the curable resin layer (b) further comprises conductive particles or flakes dispersed throughout the resin layer.

11. The surfacing material according to claim 1, wherein the curable resin layer (b) comprises one or more epoxy resins.

12. The surfacing material of claim 11, wherein the curable resin layer (b) comprises a combination of multi-functional epoxy resins, one of which is a cycloaliphatic epoxy resin represented by the following structure:

13. The surfacing material of claim 1, wherein the conductive layer is a nonporous metal foil, a metal screen or a sheet of carbon.

14. The surfacing material of claim 1, wherein the woven fabric comprises fibers selected from: glass fibers, polyester fibers, polyamide fibers, and combinations thereof.

15. The surfacing material of claim 1, wherein the surfacing material is in the form of a continuous or elongated tape having a width in the range of about 0.125 in to about 12 in.

16. A composite structure comprising:
   a composite substrate comprising a prepreg layup, which comprises a plurality of prepreg plies arranged in a stacking arrangement, each prepreg ply comprising reinforcing fibers impregnated with a curable matrix resin; and
   the surfacing material of claim 10 laminated to a surface of the composite substrate such that the curable epoxy-thermoplastic layer is an outermost layer.

17. A method for forming a composite structure comprising:
- placing the surfacing material according to claim 1 on a mold surface such that the epoxy-thermoplastic layer is in contact with the mold surface;
- forming a prepreg layup of multiple prepreg plies on the surfacing material, each prepreg ply comprising reinforcement fibers impregnated with or embedded in a curable matrix resin;
- co-curing the surfacing material and the prepreg layup so as to form a cured composite structure;
- removing the cured composite structure from the mold surface; and
- removing the woven fabric and epoxy-thermoplastic layer to reveal a hardened or cured surface that is ready for painting.

* * * * *